Dec. 19, 1967
G. N. THRESHER ETAL
3,358,709
CHECK VALVES
Filed Dec. 6, 1963
2 Sheets-Sheet 1
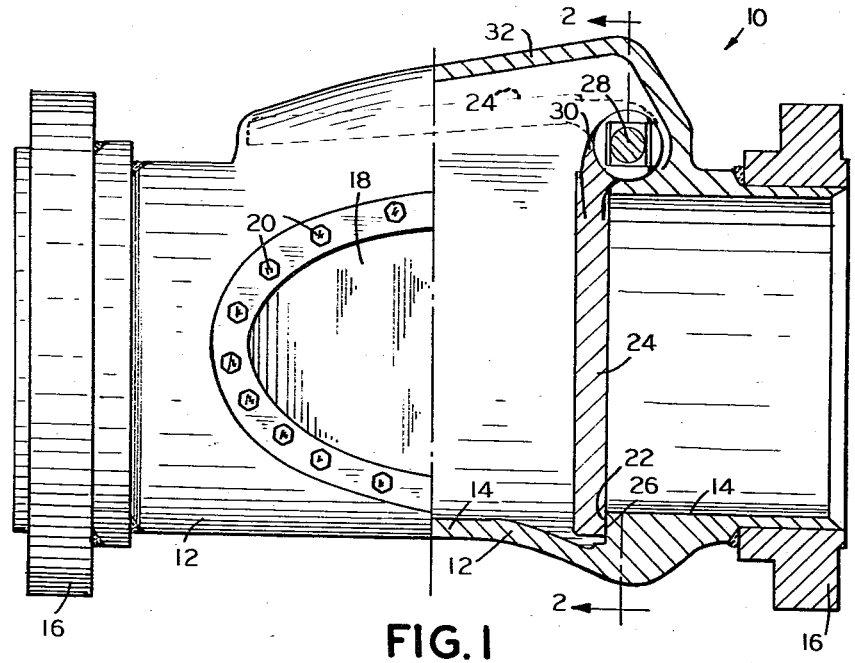
FIG. 1
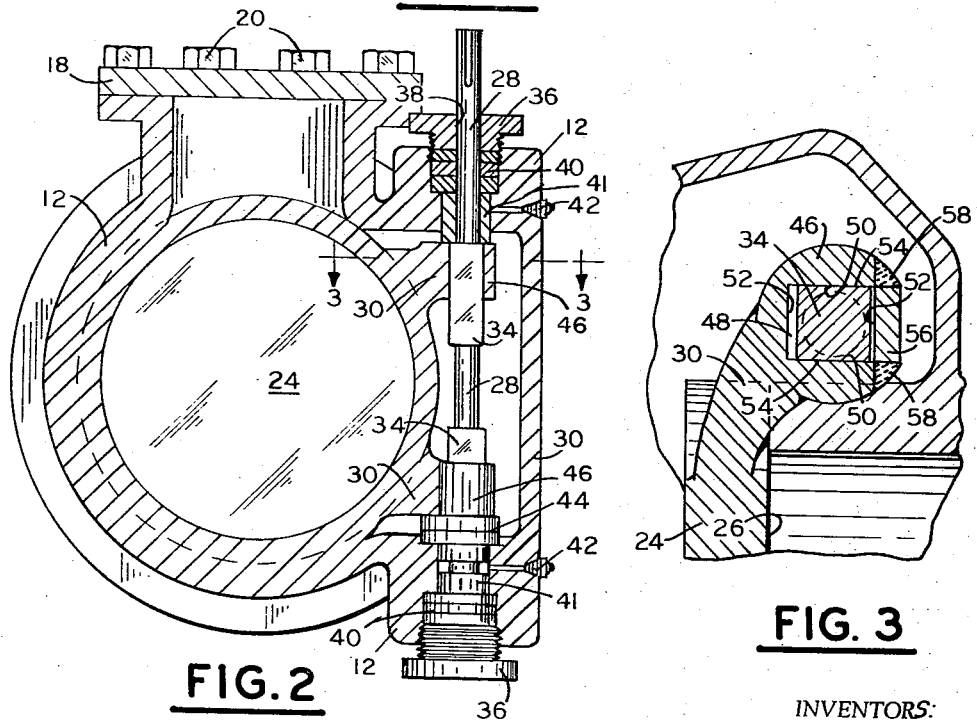
FIG. 2
FIG. 3
INVENTORS:
GRIFFITH N. THRESHER
ROBERT E. ELLIOTT
ALFRED D. HOGAN
BY Head & Johnson
ATTORNEYS

INVENTORS:
GRIFFITH N. THRESHER
ROBERT E. ELLIOTT
ALFRED D. HOGAN

BY Head & Johnson
ATTORNEYS

CHECK VALVES

Griffith N. Thresher, Robert E. Elliott, and Alfred D. Hogan, Tulsa, Okla., assignors to Frank Wheatley Industries, Inc., Tulsa, Okla., a corporation of Oklahoma
Filed Dec. 6, 1963, Ser. No. 328,577
10 Claims. (Cl. 137—527.4)

This invention relates to a check valve. More particularly, the invention relates to a check valve characterized by an inexpensively constructed clapper support means. Still more particularly, the invention relates to a check valve having an improved clapper support means, the support means comprising integral clapper arms and including means assuring alignment of the clapper with the valve seating face.

One of the problems in constructing check valves is that of assuring complete alignment of the valve clapper with the seating face formed in the body of the valve. Check valves are designed to positively prevent the flow of fluid in one direction, and to this end it is imperative that the valve clapper seat with precision against the body seating face surrounding the fluid passageway.

In the construction of larger size valves, of six inches in diameter or greater, the machining of the clapper pivot post in relation to the valve seat and the construction of a valve clapper so pivoted about the post to accurately engage the seating surface around the full 360° periphery thereof is virtually impossible. To overcome this problem it has been a practice in the valve industry to provide a clapper member loosely supported by a pivot system. Typically, the pivot system consists of a clapper arm firmly pivoted to the valve to which the clapper is flexibly mounted. In this way the clapper is free to align itself against the valve seat by the force of liquid or gas closing the valve. Such an arrangement, although functioning completely satisfactorily, has some disadvantages. First, and primarily, such arrangement is relatively expensive. Extra parts are required to provide a flexible connection between the valve arm and the valve clapper. This introduces additional expenses in valve construction. Second, a flexible support of the valve clapper means that the clapper has a tendency to droop or fall downwardly by the effect of gravity. This droop is corrected when the valve clapper initially engages the valve seat as the clapper closes. Thus, some frictional movement of the valve clapper with a portion of the valve seat occurs upon each closing.

It is therefore an object of this invention to provide a check valve of the swinging clapper type including improved means of pivotally supporting the clapper in the valve.

Another object of this invention is to provide a check valve of the swinging clapper type including the provision of pivot arms integrally affixed to the clapper and including means whereby the clapper is nevertheless free to seat itself against the valve seat surface.

Another object of this invention is to provide a check valve of the swinging clapper type including improved means of mounting the clapper to a pivot post in the valve body.

Another object of this invention is to provide a check valve of the swinging clapper type including improved means of mounting the clapper for pivotable support in the valve body in a manner wherein positive seal of the clapper against the valve seating surface is assured and in a manner achieved by improved economy of construction and assembly over other known valves.

These and other objects will be apparent and a better understanding of the invention may be had by referring to the following description and claims taken in conjunction with the attached drawings, in which:

FIGURE 1 is a top view of a valve incorporating the principles of this invention. The view is shown partially in cross section disclosing the interior arrangement of the valve.

FIGURE 2 is a cross-sectional view taken along the line 2—2 of FIGURE 1 showing details of the arrangement of the valve stem and clapper arms of the valve of this invention.

FIGURE 3 is an enlarged cross-sectional fragmentary view of one of the valve clapper arms as supported to the valve stem showing details of construction of the clapper support means of this invention.

Figure 5:
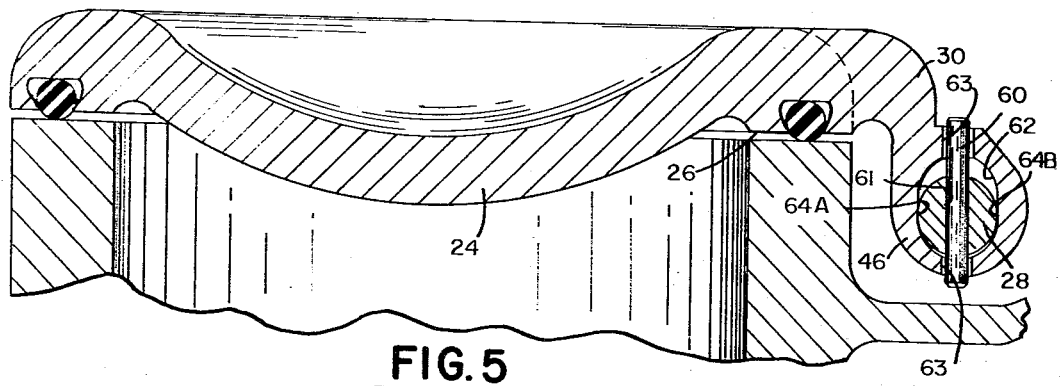
FIGURE 5 is an enlarged cross-sectional fragmentary view taken along the line 5—5 of FIGURE 4 showing the means whereby the clapper is supported to the valve stem according to an alternate embodiment of the invention.

This invention may be described as a check valve of the swinging clapper type having improved clapper pivot support means. More particularly, but not by way of limitation, the invention may be described as a check valve comprising a valve body having a fluid passage therethrough defined in part by a planar valve seat, a hinge pin pivotally supported in said body adjacent and exteriorly of said valve seat, and a clapper supported to said hinge pin, said clapper having a seating surface engageable with said valve seat when said seat is pivoted to the closed position, said clapper rigidly supported to said hinge pin in the plane of the hinge pin parallel the seating surface of said clapper and loosely supported to said hinge pin in the plane of the hinge pin perpendicular the clapper seating surface.

Referring now to the drawings and first to FIGURE 1 a check valve is generally indicated by the numeral 10. It consists basically of a body 12 having a fluid passage opening 14 therethrough. Flanges 16 may be provided at each end of the valve body 12 as a means of affixing the valve in a pipe line, but of course other means, such as threaded ends, can equally as well be utilized.

A removable cover 18 is shown supported at the top of the valve, held in place with bolts 20. Cover 18 provides a means of obtaining access to the interior of the valve. The cover 18, only half of which is shown in FIGURE 1, is eliptical, however, this is optional as it may be of any desired shape. The eliptical shape is preferred as a more convenient means of providing sufficient access to permit the entrance and removal of the interior components of the valve.

In the portion of the valve shown in cross section it can be seen that the fluid passage opening 14 through the valve body 12 is defined in part by a planar, circular valve seat 22. Valve seat 22 is substantially perpendicular to the axis of fluid passage 14. Pivotally supported within the valve body 12 is a clapper 24 having a planar seating surface 26 which, when the clapper 24 is in closed position, engages the full circumference of valve seat 22.

The valve as described up to this point is more or less a typical swinging or pivot type of check valve. The distinguishing characteristic of this invention is the means of pivotally supporting clapper 24 in the valve. To afford such pivotation, a hinge pin 28 is rotatably supported in the valve body 12 in a manner such that the axis of the hinge pin 28 is substantially in a plane parallel the plane of the valve seat 22. The hinge pin 28 is positioned exteriorly of the circular valve seating face 22. Integrally affixed to and extending from the clapper 24 is an upper and a lower clapper arm 30 (only one of which is shown in FIGURE 1), each of which engages the hinge pin 28. The manner of engagement of clapper arms 30 with hinge pin 28 is an essential feature of this invention.

As shown in dotted outline, the clapper 24, when in opened position, is completely out of the fluid passage of the valve so that full unrestricted flow through the valve is achieved. Formed in the body portion 12 is a clapper pocket 32 which receives the clapper 24 while in the open position.

Referring to FIGURE 2 the details of the arrangement of hinge pin 28 are better shown. The hinge pin 28 is provided with spaced apart square or rectangular portions 34. Tubular gland nuts 36 are threaded into the body 12. In the arrangement shown in FIGURE 2 a portion of the hinge pin 28 extends exteriorly of the valve through the upper tubular gland nut. Packing 40 is provided as a means of preventing the escape of liquid or gas from the valve.

Bushings 41, which may be of Delrin, or some equivalent material, serve to firmly and pivotably support the shaft 28. Provision is shown wherein the bushings may be lubricated by means of grease fittings 42.

Interposed between the bottom of the lower clapper arm 30 and the body 12 are thrust bearings 44 which serve to pivotally support the weight of clapper 24. Thrust bearings 44 may be of the metallic, that is, ball bearing type or may be formed of thrust washers of Delrin or equivalent material.

The specific arrangement of the means to pivotally support the hinge pin 28 is not critical to the invention and such has been shown and described only for purposes of exemplification and clarity. The essence of the invention is the means of mounting the clapper to the hinge pin.

Referring to FIGURE 3 the details of the arrangement whereby the clapper arms 30 are supported to hinge pin 28 are best shown. Each of the clapper arms 30 terminate in an integral boss portion 46 having a pin receiving opening 48 therein. The pin receiving opening 48 in each arm 30 is defined in part by paralleled sides 50. The paralleled sides 50 are in planes substantially perpendicular the plane of the seating surface 26 of clapper 24.

The pin receiving opening 48 in the integral boss portion 46 of each of the arms 30 is closed at each end of the paralleled sides 50 at 52. The specific configuration of the closing sides 52 is irrelevant, however, they are preferably flat as shown in FIGURE 3.

The paralleled sides 50 of the pin receiving opening 48 closely but slidably receive the corresponding paralleled sides 54 of the hinge pin square portions 34. The distance between the closing sides 52 of each of the openings 48 must be greater than the distance between the corresponding sides of square portion 34 of the pin to permit movement of the arms, and therefore the clapper 24, in a plane parallel the paralleled sides 50. In this manner the clapper 24 is free to move in a plane parallel the plane of pin 28 when such plane is drawn perpendicular to the seating surface 26 of the clapper, but is restrained from moving in the plane of the pin drawn parallel the seating surface 26. This means that as the seating surface 26 of the clapper closes against the valve seat 22 the clapper can freely align itself, but in a manner wherein the valve clapper 24 cannot sag or pivot downwardly by the weight of the clapper as it is closed against the valve seating face.

Another important element of this invention is the means of providing the pin receiving opening 48 in the bosses 46 of the clapper arms 30. As shown in FIGURE 3 there is first formed a U-shaped opening in each of the bosses 46, the opening having paralleled sides 50. To complete the construction a closing plate 56 is placed across the open end of the U-shaped opening and is welded in position, the welds being identified by the numeral 58. The distance between the closing sides 52 of the opening 48 is not critical and therefore plate 56 may be welded into position without concern about acurate dimensioning. As long as the dimensions of the paralleled sides 50 are maintained in accurate relationship relative to the paralleled sides 54 of the pin 28, the valve will function perfectly.

In the preferred embodiment shown, the square portions 34 of pin 28 are formed of a square cross-sectional configuration, while the pin receiving openings 48 are of substantially rectangular cross-sectional configuration. It is understood that this arangement is not restrictive since only the slidable but snug fitting of the paralleled sides 54 of the pin 28 is important to proper functioning of the invention.

Figure 4:
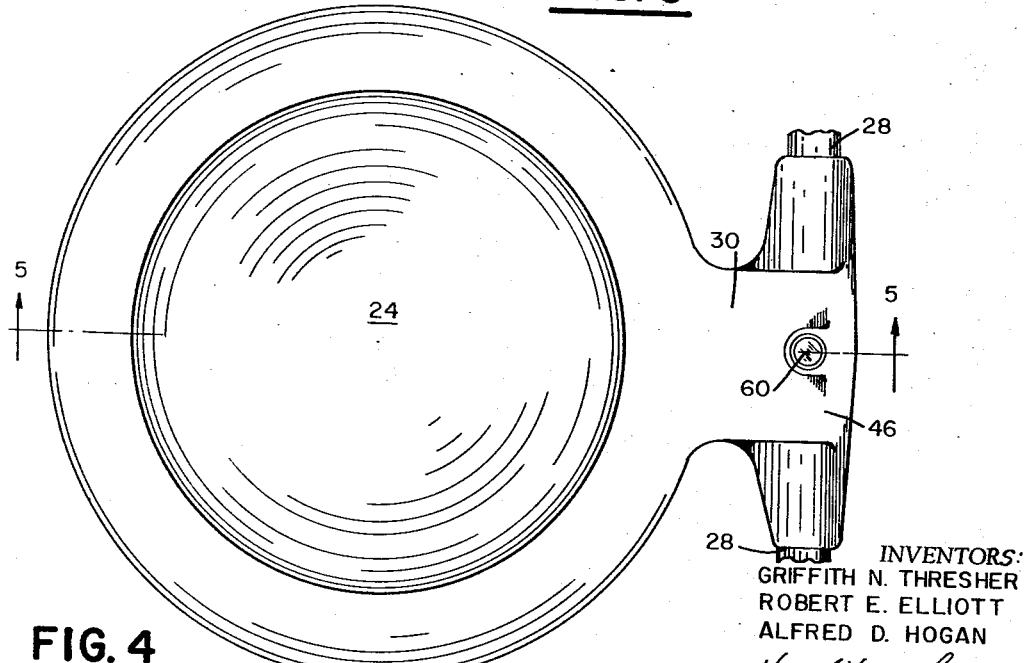
FIGURE 4 is a view of a valve clapper and a portion of a valve stem showing the arrangement wherein the valve stem is provided with only one integrally formed arm and wherein the arm is supported to the valve stem in a manner shown in the embodiment of FIGURE 5.

Referring now to FIGURES 4 and 5, an alternate embodiment of the invention is shown. This embodiment utilizes a clapper 24 having a single integrally formed arm 30 terminating in an enlarged boss portion 46. The boss portion 46 includes a longitudinal opening to receive cylindrical arm pin 28. A key 60 is shown press fitted into key opening 61 in arm pin 28. Boss portion 46 is provided with axially aligned key openings 63 of a diameter slightly larger than the diameter of key 60. The axis of key openings 63 is substantially perpendicular the clapper seating face 26.

FIGURE 5 best discloses the use of key 60. Arm boss portion 46 is provided, as previously mentioned, with a longitudinal opening, indicated by the numeral 62, to receive arm pin 28. Opening 62 is broached or obround in cross-section. Opening 62 is defined by paralleled sides 64A and 64B which are in planes substantially perpendicular the clapper seating face 26. Thus opening 62 is of a cross-sectional configuration permitting movement of the boss portion 46, and therefore the clapper 24, in a plane perpendicular the plane of the clapper seating face 26. At the same time the clapper is firmly supported to arm pin 28 in the plane parallel the plane of the clapper seating face 26.

In the embodiment of the invention in FIGURES 4 and 5, key 60 is utilized only when it is desired to insure the rotation of the arm pin 28 with the rotation of clapper 24. More precisely, key 60 is required only when it is desired to extend the arm pin 28 exteriorly of the valve body, such as shown in FIGURE 2, so that external indication is given of the clapper position. It is irrelevant, as regards the functioning of the valve, whether the arm pin 28 rotates with the clapper or whether the clapper 24 rotates about the arm pin.

Figure 6:
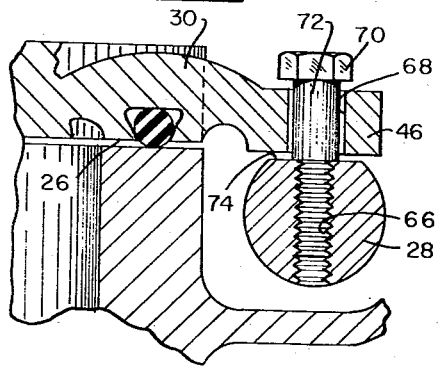
FIGURE 6 is an enlarged cross-sectional fragmentary view of a check valve clapper supported to a valve stem according to an additional alternate embodiment of the invention.

Referring to FIGURE 6 an additional alternate embodiment of the invention is shown. Hinge pin 28 is provided with a pair (only one of which is shown) of threaded openings 66. Each of a pair of clapper arms 30 (only one of which is shown) terminates in a boss portion 46 having a bolt receiving opening 68 therein. A bolt 70 is threaded into each opening 66, the bolts being received by openings 68 which are of a diameter slightly larger than that of the bolts. Bolts 70 are preferably of the type having an enlarged non-threaded shoulder forming portion 72, and hinge pin 28 is preferably flattened in the areas adjacent clapper arm boss portions 46, as indicated by the numeral 74.

The shoulder portion 72 of bolts 70 is longer than the thickness of boss portions 46 so that the boss portions and therefore the clapper 24 is displaceable relative to the hinge pin 28 in the plane of the axis of the bolts.

In the arrangement shown in FIGURE 6, as is true of the other embodiments of the invention, clapper 24 is firmly supported to the hinge pin 28 in the plane parallel the seating face 26 but is displaceably supported in the plane perpendicular the seating face.

Although this invention has been described with a certain degree of particularity it is manifest that many changes may be made in the details of construction and the arrangement of components without departing from the spirit and scope of this disclosure.

What is claimed:

1. A check valve comprising:
   a valve body having a fluid passage therethrough defined in part by a planar valve seat and a small diameter hinge pin opening therein;
   a hinge pin rotatively supported in said body about a fixed axis adjacent and exteriorly of said valve seat and in a plane substantially parallel the plane of said valve seat, a portion of said hinge pin extending sealably exteriorly of said body through said hinge pin opening; and
   a clapper supported to said hinge pin, said clapper having a seating face sealably engaging said body valve seat when said clapper is pivoted to the closed position, said clapper rigidly supported to said hinge pin in the plane of the face of the clapper and loosely supported in the plane of the hinge pin perpendicular to the clapper seating face.

2. A check valve comprising:
   a valve body having a fluid passage therethrough defined in part by a planar valve seat and a small diameter hinge pin opening therein;
   a hinge pin rotatively supported in said body about a fixed axis adjacent and exteriorly of said valve seat and in a plane substantially parallel the plane of said valve seat, a portion of said hinge pin extending sealably exteriorily of said valve body through said hinge pin opening said hinge pin having the intermediate portion thereof of a square cross-sectional configuration as the cross section is taken perpendicular the pin axis; and
   a clapper supported to said hinge pin, said clapper having a seating face sealably engaging said body valve seat when said clapper is pivoted to the closed position, said clapper having an integral clapper arm extending therefrom, said clapper arm having a pin receiving opening therein, said pin receiving opening of substantially rectangular cross-sectional configuration, and being of greater dimension than the corresponding sides of the hinge pin in the plane perpendicular to the clapper face, to snugly and slidably receive said square cross-sectional configured portion of said hinge pin.

3. A check valve according to claim 2 wherein said pin receiving opening in said clapper arm is of a parallel sided U-shaped cross-sectional open ended configuration and including:
   a closing plate welded to the end of said pivot arm to close said pin receiving opening therein.

4. A check valve comprising:
   a valve body having a cylindrical fluid passage therethrough, a portion of said passage defined by a valve seat, said valve seat providing a circular flat seat in a plane substantially perpendicular the axis of the fluid passage opening, said body having a small diameter hinge pin opening therein;
   a substantially circular flat valve clapper having a seating surface on one face thereof, said clapper pivotably supported in said body, said clapper in the closed attitude of said valve in sealed engagement with said body valve seat, said clapper having an integrally formed arm extending from the periphery thereof, said arm terminating in a pin receiving integral boss portion, said boss portion having a longitudinal opening therethrough, said opening defined in part by paralleled flat sides, said sides of said opening lying in planes perpendicular to the plane of the said seating face of said clapper and being of greater dimension than the corresponding sides of the hinge pin; and
   a hinge pin pivotably supported in said body in a fixed axis and in a plane substantially parallel the plane of the valve seat formed in said body, said pin having a clapper arm receiving portion defined in cross section in part by parallel sides, said hinge pin received by said opening in said clapper arm boss portion wherein the paralleled sides of said arm receiving portion of said hinge pin snugly and slidably engage the paralleled sides of said clapper arm boss opening.

5. A check valve according to claim 4 wherein said clapper arm boss opening is of a parallel sided U-shaped cross-sectional open-ended configuration and including:
   a closing plate welded to the end of said clapper arm boss to close said boss opening therein.

6. A check valve comprising:
   a valve body having a cylindrical fluid passage therethrough, a portion of said passage defined by a valve seat, said valve seat providing a circular flat seat in a plane substantially perpendicular the axis of the fluid passage opening, said body having a small diameter hinge pin opening therein;
   a substantially circular flat valve clapper having a seating surface on one face thereof, said clapper pivotably supported in said body, said clapper in the closed attitude of said valve in sealed engagement with said body valve seat, said clapper having a pair of spaced apart paralleled integrally formed arms extending from the periphery thereof, each of said arms terminating in a pin receiving integral boss portion, each of said boss portions having a mutually aligned opening therethrough, each of said openings defined in part by parallel flat sides, each of the said sides of the opening in each of said boss portions aligned with the corresponding sides of the opening in the other of said bosses, said sides of said openings lying in planes perpendicular the plane of the said seating face of said clapper and being of greater dimension than the corresponding sides of the hinge pin; and
   a hinge pin pivotably supported in said body in a plane substantially parallel the plane of the valve seat formed in said body, said pin having spaced clapper arm receiving portions, said portions defined in cross section in part by parallel sides, the paralleled sides of each portion aligned with the paralleled sides of the other portion, said hinge pin received by said opening in each of said boss portions wherein the paralleled sides of said arm receiving portions snugly and slidably engage the paralleled sides of each of said boss openings, said hinge pin having a portion thereof extending sealably externally of said valve body.

7. A check valve according to claim 6 wherein each of said boss openings is of a parallel sided U-shaped cross-sectional open-ended configuration and including:
   a closing plate welded to the end of each of said pivot arm bosses to close said boss openings therein.

8. A check valve comprising:
   a valve body having a fluid passage therethrough defined in part by a planar valve seat and said body having a small diameter hinge pin receiving opening therein;
   a cylindrical hinge pin rotatively supported in said body about a fixed axis adjacent and exteriorly of said valve seat and in a plane substantially parallel the plane of said valve seat, a portion of said hinge pin extending sealably externally of said body; and
   a clapper supported by said hinge pin, said clapper having a seating face sealably engaging said body valve seat when said clapper is pivoted to the closed position, said clapper having at least one integral clapper arm extending therefrom, each of said clapper arms terminating in an integral boss portion, each of said boss portions having a longitudinal hinge pin receiving opening therein, said opening of a parallel sided cross-sectional configuration, the distance between said parallel sides slightly greater than the diameter of said hinge pin, said parallel sides lying in planes substantially perpendicular the said seating face of said clapper.

9. A check valve according to claim 8 wherein said hinge pin has a key opening therein substantially perpendicular the longitudinal axis of said hinge pin, and wherein said boss portion has axially aligned key openings therein, the axis thereof substantially perpendicular the axis of longitudinal hinge pin receiving opening and substantially parallel to the paralleled sides of said hinge pin opening, and including a key firmly supported in said key opening of said hinge pin and extending through said key openings in said boss portions, said key openings in said boss portions loosely receiving said key.

10. A check valve comprising:
a valve body having a fluid passage therethrough defined in part by a planar valve seat and said body having a small diameter hinge pin receiving opening therein;
a cylindrical hinge pin rotatively supported in said body about a fixed axis adjacent and exteriorly of said valve seat and in a plane substantially parallel the plane of said valve seat, said hinge pin having a pair of spaced threaded openings therein, said hinge pin having a portion thereof extending sealably exteriorly of said body through said hinge pin opening; and
a clapper supported by said hinge pin, said clapper having a seating face sealably engaging said body valve seat when said clapper is pivoted to the closed position, said clapper having a pair of spaced integral clapper arms extending therefrom, each of said clapper arms having an opening therein, the axis of each of said openings lying substantially in a plane perpendicular the clapper seating face; and
a bolt threadably supported in each of said threaded openings of said hinge pin, each of said clapper arm openings loosely receiving one of said bolts whereby said clapper is firmly supported by said hinge pin in the plane of said seating face and displaceably supported to said hinge pin in the plane perpendicular to the said seating face.

References Cited

UNITED STATES PATENTS

| | | | |
|---|---|---|---|
| 496,045 | 4/1893 | Dinsmore | 251—298 |
| 1,980,495 | 11/1934 | Muir | 251—298 |
| 2,282,532 | 5/1942 | Shenk | 137—527.4 |
| 2,611,435 | 9/1952 | Janiszewski | 308—3 |

FOREIGN PATENTS

| | | |
|---|---|---|
| 1,182,255 | 6/1959 | France. |
| 17,947 | 9/1899 | Great Britian. |

WILLIAM F. O'DEA, *Primary Examiner.*

H. M. COHN, *Assistant Examiner.*